(12) United States Patent
Taylor

(10) Patent No.: US 6,609,155 B1
(45) Date of Patent: Aug. 19, 2003

(54) METHOD AND APPARATUS FOR PROVIDING RELATIONSHIPS IN SIMPLE NETWORK MANAGEMENT PROTOCOL MANAGEMENT INFORMATION BASE

(75) Inventor: Kurt Russell Taylor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,676

(22) Filed: May 25, 2000

(51) Int. Cl.[7] ............................................... G06F 15/16
(52) U.S. Cl. ...................................... 709/230; 709/302
(58) Field of Search ................................. 709/302, 230; 707/103

(56) References Cited

U.S. PATENT DOCUMENTS

| | | | | |
|---|---|---|---|---|
| 5,815,710 A | * | 9/1998 | Martin et al. ................ | 709/316 |
| 5,910,180 A | * | 6/1999 | Flory et al. .................. | 709/301 |
| 6,009,476 A | * | 12/1999 | Flory et al. .................... | 712/1 |
| 6,016,515 A | * | 1/2000 | Shaw et al. .................. | 709/301 |
| 6,173,421 B1 | * | 1/2001 | Johnson et al. ............... | 714/38 |
| 6,205,492 B1 | * | 3/2001 | Shaw et al. .................. | 709/321 |
| 6,209,041 B1 | * | 3/2001 | Shaw et al. .................. | 709/321 |
| 6,289,396 B1 | * | 9/2001 | Keller et al. ................ | 709/323 |
| 6,401,101 B1 | * | 6/2002 | Britton et al. .............. | 707/103 |

* cited by examiner

Primary Examiner—David Y. Eng
(74) Attorney, Agent, or Firm—Duke W. Yee; Volel Emile; Stephen J. Walder, Jr.

(57) ABSTRACT

A method and apparatus for providing relationships in a Simple Network Management Protocol (SNMP) Management Information Database (MIB) is provided. The method and apparatus provides a mechanism by which a management application can recognize and dynamically establish relationships between objects in an SNMP MIB supported by a SNMP agent device. The method and apparatus make use of a new Relationship MIB extension having table records for object relationships in MIB extensions.

33 Claims, 3 Drawing Sheets

METHOD AND APPARATUS FOR PROVIDING RELATIONSHIPS IN SIMPLE NETWORK MANAGEMENT PROTOCOL MANAGEMENT INFORMATION BASE

BACKGROUND OF THE INVENTION

1. Technical Field

The present invention is directed to a method and apparatus for providing relationships in a simple network management protocol (SNMP) management information base (MIB).

2. Description of Related Art

In distributed data networks, servers have the ability to make use of the Internet Standard Management Framework Simple Network Management Protocol (SNMP) interface. Although these servers have traditionally been used primarily in network management, they can also be used for system management solutions.

In known systems, in order for a management application to manage a networked computer or server, the management application must make use of vender specific and standardized Management Information Base (MIB) extensions. These MIB extensions may be used, for example, to show the configurable information for a printer or a user. At the time of their definition, it was enough to just model the data specific to the device or server resource. However, it is becoming more important to show the relationships between these sets of data.

Thus, it would be beneficial to have a method and apparatus for providing relationships between items of data in vendor specific and or standard MIB extensions.

SUMMARY OF THE INVENTION

A method and apparatus for providing relationships in a Simple Network Management Protocol (SNMP) Management Information Database (MIB) is provided. The method and apparatus provides a mechanism by which a management application can recognize and dynamically establish relationships between objects in an SNMP MIB supported by a SNMP agent device. The method and apparatus make use of a new Relationship MIB extension having table records for object relationships in MIB extensions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
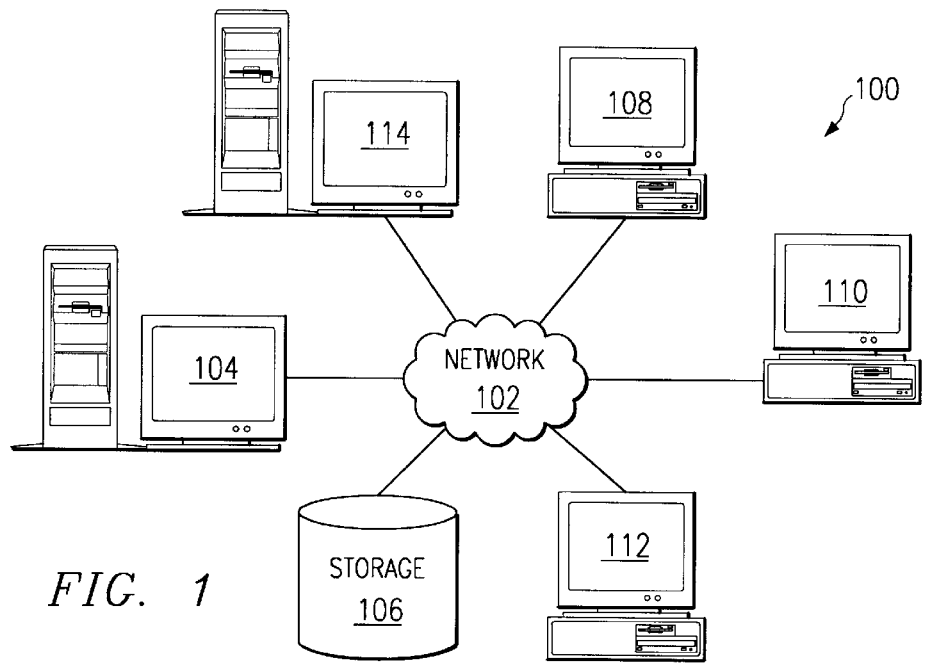
FIG. 1 is an exemplary diagram of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented.

Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network.

In the depicted example, server 104 provides data, such as boot files, operating system images, and applications to clients 108–112. Clients 108, 110, and 112 are clients to server 104. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN).

A management server 114 is connected to the network 102. The management server 114 runs one or more network device management applications that remotely manage the various network devices 104–112 based on management information gathered from the network devices 104–112. While a management "server" is shown in FIG. 1, the management functions of the present invention may be performed by management applications resident on any type computing device connected to the network 102. The management server implementation of the present invention is used only for illustrative purposes and one of ordinary skill in the art will recognize that the functions of the present invention may be implemented by one or more computing devices other than the management server 114.

The network devices are remotely managed, for example, using the Simple Network Management Protocol (SNMP), or other equivalent management protocol. SNMP is a widely-used network monitoring and control protocol. Data is passed from SNMP agents, which are hardware and/or software processes reporting activity in each network device 104–112 to the computing device used to oversee the network, i.e. management server 114. The agents return information contained in a Management Information Base (MIB), which is a data structure that defines what is obtainable from the device and what can be controlled (turned off, on, etc.).

FIG. 1 is intended as an example, and not as an architectural limitation for the present invention. As may be readily apparent to those of ordinary skill in the art, many other types of devices may be connected to the network 102 without departing from the spirit and scope of the present invention. For example, the network 102 may provide a communication pathway for client devices to send and receive data from printers, plotters, scanners, multiple drive libraries, and the like.

Figure 2:
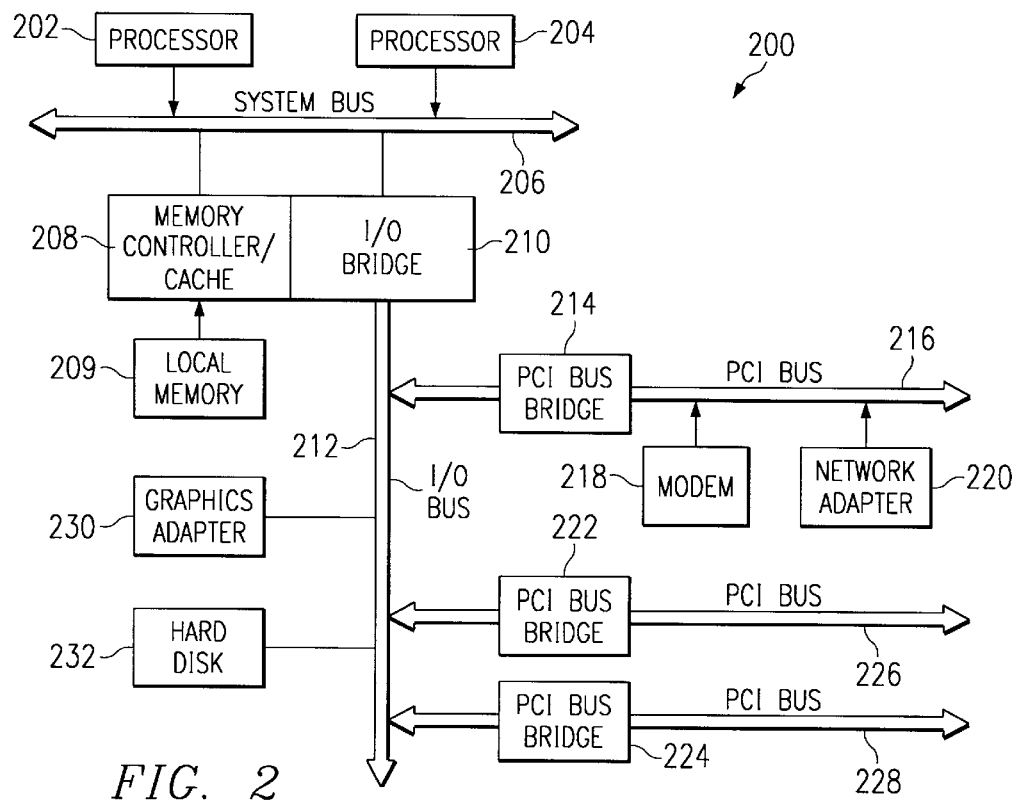
FIG. 2 is an exemplary block diagram of a management server system or a managed server system according to the present invention.

Referring to FIG. 2, a block diagram of a data processing system that may be implemented as a management server, such as management server 114 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted.

The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

The management server, such as management server 114, includes one or more network device management applications used to remotely manage a plurality of network devices 104–112 over a network 102. These one or more network device management applications may be stored in local memory 209, for example, and used to control the operations of the processor 202 or 204 in a remote server. In addition, the management application 114 stores information related to the MIB extensions usable with the various network devices 104–112. These MIB extensions are then used by the management server 114, under control of the one or more network device management applications, to manage the operations of the network devices 104–112.

As mentioned above, in a preferred embodiment of the present invention, the management applications on the management server 114 manage the network devices 104–112 using SNMP. Thus, the network devices 104–112 are SNMP agent devices capable of communicating with the management applications on the management server 114 via SNMP. For purposes of the following explanation of the operation and features of the present invention, it will be assumed that the SNMP agent device is a server such as server 104 and that a single management application is executed by the management server 114. Therefore, with the following description of the present invention, when the management application is referred to, what is meant is the management application as it is executed by the management server 114.

Figure 3:
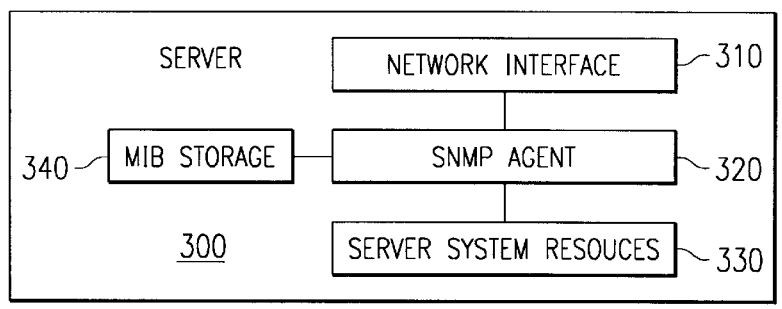
FIG. 3 is an exemplary functional block diagram of a remotely managed server according to the present invention.

With reference now to FIG. 3, a block diagram illustrating an SNMP agent device according to the present invention is provided. As shown in FIG. 3, the SNMP agent device is a server 300. The server 300 includes a network interface 310, a SNMP agent 320, one or more server system resources 330, and a MIB information storage 340. These different elements 310–340 may be implemented, for example, in hardware, as software running on a processor, or a combination of hardware and software of the server 300.

The network interface 310 allows the server 300 to communicate with network devices via the network 102 using a data transmission protocol. For example, in the case of the network 102 being the Internet, the network interface 310 provides an interface for communicating with other network devices via the Transmission Control Protocol/Internet Protocol (TCP/IP) suite of protocols.

The SNMP agent 320 provides a mechanism by which the server 300 communicates with the management application using SNMP. The SNMP agent 320 sends reply messages to the management application in response to request messages received from the management application. These reply messages will typically include MIB information obtained from the MIB information storage 340.

The SNMP agent 320 uses commands, scripts, etc. to obtain information about the server system resources 330. The server system resources 330 may include, for example, device drivers, command line, data structures, and the like. The information obtained by the SNMP agent 320 is then stored in the form of MIB information in the MIB information storage 340. This MIB information storage 340 may be a non-persistent storage device, such as a RAM, or persistent storage device, such as a hard drive. The MIB information follows the MIB tree data structure format which is an SNMP data structure that describes the particular device being monitored.

Figure 4:
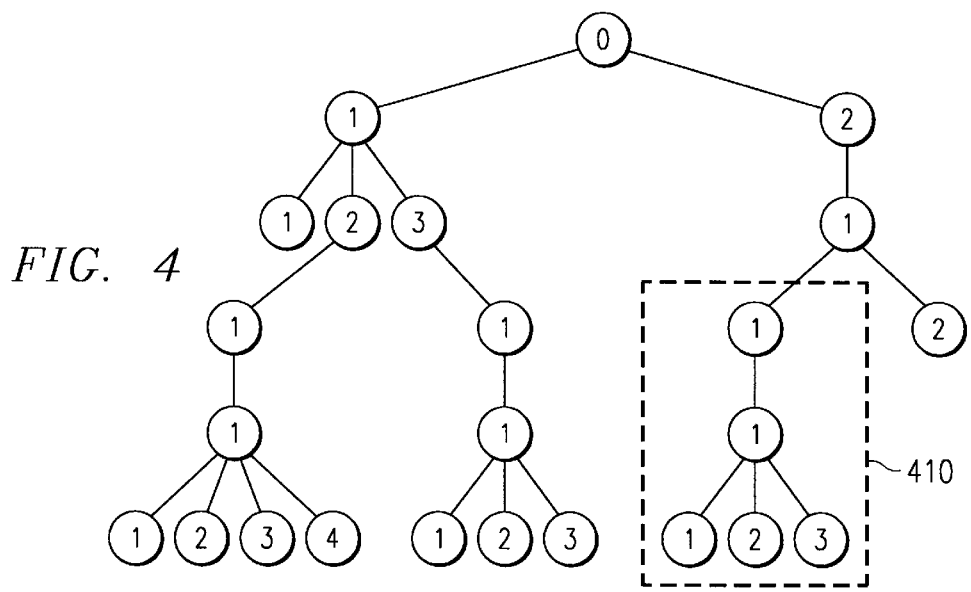
FIG. 4 is an exemplary diagram illustrating an MIB tree data structure.

FIG. 4 is an exemplary diagram of a MIB tree data structure 400 according to the present invention. FIG. 4 is only intended to be a simplified depiction of a fictitious MIB tree data structure that will aid in the understanding of the present invention and does not necessarily correspond to an actual MIB tree data structure standardized by the Internet Engineering Task Force (IETF). It should be noted that, while FIG. 4 depicts some nodes as having a single branch, these nodes may contain additional branches which are not shown for clarity. FIG. 4 is only an example to illustrate the operation and benefits of the present invention, actual implementations may make use of different MIB tree data structures of more or less complicated architectures.

As shown in FIG. 4, the nodes of the MIB tree data structure (hereafter referred to as the "MIB tree") designate "objects" and are represented by object identifiers (OIDs). An "object" in the context of a MIB tree refers to an entry in the MIB tree. These object OIDs are often referred to by their human readable branch names rather than their numerical value. Thus, for example, an object OID of a MIB tree may have a numerical value but be referred to as "Age" or "Name" or the like. The objects of the MIB tree represent tables and record entries within tables. Thus, for example, a table "Person" may be comprised of records having entries corresponding to an index, a name, an age, and a shoe size.

The objects of the MIB tree are designated by numerical values identifying the branch taken from the previous node in the tree to arrive at the current node. A node, therefore, is identified by the numerical values of that node's parent nodes, each separated by a period, in the adopted convention. Thus, for example, the string of numerical values "0.1.1" designates the left most node in the third layer down in the MIB tree depicted in FIG. 4. Similarly, "0.1.2.1.1.1" designates the left most node in the bottom layer of the MIB tree. These strings of numerical identifiers are often referred to as object identifiers or OIDs. By convention, the leading "0" in the OID is left off. Thus, the OID "0.1.2.1.1.1" will be referred to as "1.2.1.1.1".

In FIG. 4, one of the example MIB extensions used to describe the present invention will be considered to be a "Person" MIB, that is, a MIB data structure identifying a person, such as a user of the server 300. The "Person" MIB is anchored at node 1.2. By the term "anchored" what is meant is that this is the top most node in the MIB tree that begins the designation of a "person" in the MIB tree. That is, the branch name for node 1.2 is "person", the child nodes of this node designate various attributes of the "person" node.

In this example, the person MIB has one table, identified by the OID 1.2.1. This table has a record OID at 1.2.1.1. A record OID is simply a place holder in a table and itself is not addressable. The record has entries for an Index at 1.2.1.1.1, Name at 1.2.1.1.2, Age at 1.2.1.1.3, and shoe size at 1.2.1.1.4.

Also in the depicted example, a "printer" MIB extension is shown. The printer MIB extension is anchored at node 1.3. The printer MIB also has one table, identified by the OID 1.3.1. This table has a record OID 1.3.1.1 having entries for a Printer Index at 1.3.1.1.1, Printer Type at 1.3.1.1.2, and Printer Location at 1.3.1.1.3.

Thus, for example, if a SNMP agent has the capability of using the "Person" MIB as described in FIG. 4, the management application will have previous knowledge of this capability and know what each of the OIDs are and the syntax of their use. The management application will then make use of this information to manage the operation of the SNMP agent device in accordance with the MIB tree and MIB extensions described above.

The SNMP agent stores MIB information using the MIB tree data structure described above. The MIB tree data structure described above is simply the template for the SNMP agent to store particular instances of the objects in the MIB tree data structure. Thus, when the SNMP agent stores MIB information using the MIB tree data structure, it is done by referencing the OID of the object followed by the instance of the object. For example, a single instance of the Person table record entry may be given the instance index of 1. These instances may then be given values in the following manner:

1.PersonMIB.PersonTable.PersonEntry.Index.1 (1.2.1.1.1.1)=1

1.PersonMIB.PersonTable.PersonEntry.Name.1 (1.2.1.1.2.1)=John Doe

1.PersonMIB.PersonTable.PersonEntry.Age.1 (1.2.1.1.3.1)=77

1.PersonMIB.PersonTable.PersonEntry.ShoeSize.1 (1.2.1.1.4.1)=13

Similarly, the Printer MIB extension defined previously might have a printer defined with an instance index also of 1. This record in the Printer MIB then could have values as follows:

1.PrinterMIB.PrinterTable.PrinterEntry.Index.1 (1.3.1.1.1.1)=1

1.PrinterMIB.PrinterTable.PrinterEntry.Type.1 (1.3.1.1.2.1)=Brandname InkJet

1.PrinterMIB.PrinterTable.PrinterEntry.Location.1 (1.3.1.1.3.1)=Office 3Q211

With increased emphasis on security of computer networks, it is increasingly becoming important to manage the relationships of network resources such that access to network resources is provided while maintaining necessary levels of security. The present invention provides a mechanism by which the relationships of server resources to other server resources and to users of these server resources may be identified and maintained by a system administrator for use by a management application. Security is just one of many uses for establishing relationships between server resource objects.

The present invention makes use of a new MIB extension, hereafter referred to as the Relationship MIB extension (located at 2.1.1 in the depicted MIB tree), having a new MIB table record in the MIB tree, which may be embodied as data structures stored in memory. This MIB table record includes a relationship table record 410 for defining relationships between MIB objects for all extensions supported by the SNMP agent.

The relationship table record 410 includes the following MIB OIDs, in accordance with the example in FIG. 4, and their corresponding identifiers:

2.1.1.1.1 Index 2.1.1.1.2 Text Description 2.1.1.1.3 Relationship Access

In addition, a relationshp flag located at 2.1.2, may be used for the convenience of the system administrator, to identify whether relationships between objects have been configured. If the system administrator has configured relationships, this flag is set to true. Initially, a management application may test this field to determine if it needs to spend time querying for additional relationships.

With the present invention, when the management application is to manage a particular network device, the management application sends a query message to the SNMP agent device requesting a response identifying whether relationship information is supported by the SNMP agent device. The SNMP agent device receives this query via the network interface 310, for example, and forwards the request to the SNMP agent 320. The SNMP agent 320 sends a reply message back to the management application via the network interface 310 indicating that relationships are supported. This may be determined based on, for example, the relationship MIB extension table, as obtained from the MIB information storage 340. The SNMP agent has the relationship MIB extension information available to it via it's system configuration and makes available this relationship MIB extension information once it is configured by the system administrator.

Based on the configured relationship information, the management application determines if any relationship information for a relationship of interest is available from the SNMP agent device. That is, a determination is made as to whether that SNMP agent device has available any configured relationships the management application may need for managing the objects it is currently interested in. This may be, for example, a user device and a printer, a user device and a server, and the like.

If relationship information between two objects of interest to the management application is available from the SNMP agent device, a query message is sent to the SNMP agent device to retrieve all the relationship information specific to that pairing. The relationship information that is sent in the reply message from the SNMP agent device to the management application may include, for example, the index, text description and relationship access of each table record in the table. The sending of this information for each relationship in the MIB tree may be performed, for example, using the Get-Next and Get-Bulk SNMP protocol methods.

For the particular example shown in FIG. 4, the information in the relationship MIB information sent to the management application may include information identifying the relationships between a Person MIB record and a printer MIB record. The relationship MIB extension information sent to the management application for this relationship may look like:

2.RelatDescr.RelatTable.RelatTableEntry.Indx.1.3.1.1.2.1:1.2.1.1.1.1 (2.1.1.1.1.3.1.1.2.1:1.2.1.1.1.1.)= 1.3.1.1.1.1:1.2.1.1.1.1

2.RelatDescr.RelatTable.RelatTableEntry.Descr.1.3.1.1.1.1:1.2.1.1.1.1 (2.1.1.1.2.1.3.1.1.2.1:1.2.1.1.1.1)=Printer access for this person 2.RelatDescr.RelatTable.RelatTableEntry.Access.1.3.1.1.1.1:1.2.1.1.1.1 (2.1.1.1.3.1.3.1.1.2.1:1.2.1.1.1.1)=Granted (could be Denied, etc)

The above example shows a defined relationship between the first printer "Type" instance (1.3.1.1.1.1) in the printer MIB extension and the first person "Name" instance (1.2.1.1.1.1) in the person MIB extension. The relationship information is used to construct a management data structure in the management application which is used to manage the access to the printer by a particular person. In this way, the management application is able to identify relationships between server resources and server users.

The management application accesses the relationship by requesting from the agent if there are any relationships defined for the object in question. For instance, in the example above, a management application would query the agent for any relationships for the printer instance defined in the printer MIB extension at 1.3.1.1.1.1 (Brandname Inkjet). The agent would go to its table of relationships in the relationship MIB extension and go to the index at 1.3.1.1.1.1:0 and return the first instance of a defined relationship, in this case, the person instance defined in the person MIB extension at 1.2.1.1.1.1 (John Doe). This relationship would have an instance index into the relationship MIB extension of 1.3.1.1.1.1:1.2.1.1.1.1. This colon separated index gives the management application and the agent special abilities to be able to go directly to the relationship being queried without having to search the entire relationship table.

Known systems require a separate configuration repository with a heavy relational database for maintaining records of access permissions for various server resources. With the present invention, relationship MIB extension information is configured by the server administrator dynamically between what would have otherwise been two static MIB objects. Due to the efficient nature of SNMP management, the database overhead is greatly reduced and management processing is centralized to the management application thereby providing a more efficient use of server resources.

Figure 5:
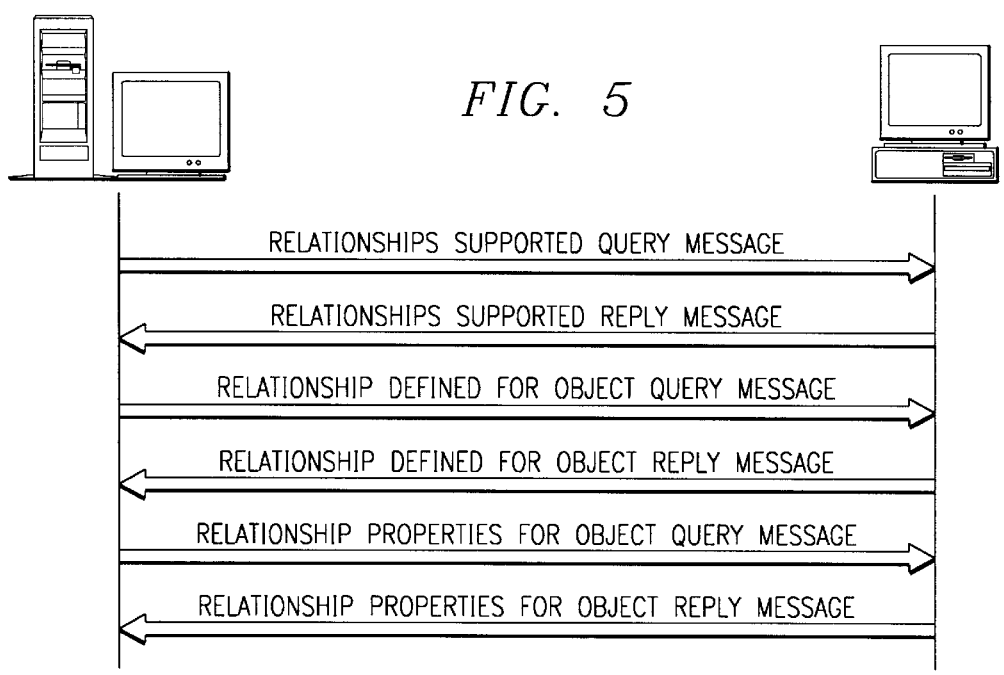
FIG. 5 is an exemplary message flow diagram according to the present invention.

FIG. 5 is an exemplary message flow diagram illustrating the flow of messages between a management application, executed by a computing device such as management server 114, and an SNMP agent device. As shown in FIG. 5, the management application sends a relationships supported query message to the SNMP agent device. In response, the SNMP agent device sends a relationships supported reply message back to the management server. This reply message includes information indicating whether relationship information has been configured by the server system administrator and is available from the SNMP agent device. Whether the system administrator has configured relationship information may be determined based on the relationship flag at 2.1.2, for example.

The management application then sends a query message for a relationship defined for a MIB object to the SNMP agent device. In response, the SNMP agent device sends a reply message to the management application identifying the relationship being available from the SNMP agent device who retrieves the information from, for example, the relationship table record 410, as described above.

The management application then sends a query message for relationship properties for the relationship between the MIB object and the SNMP agent device MIB object. The management application then receives a corresponding response message that includes the relationship properties. This information is used by the management application to create a relationship (or link) between two otherwise static MIB objects. This process may be repeated for each MIB object that the management application is interested in.

Figure 6:
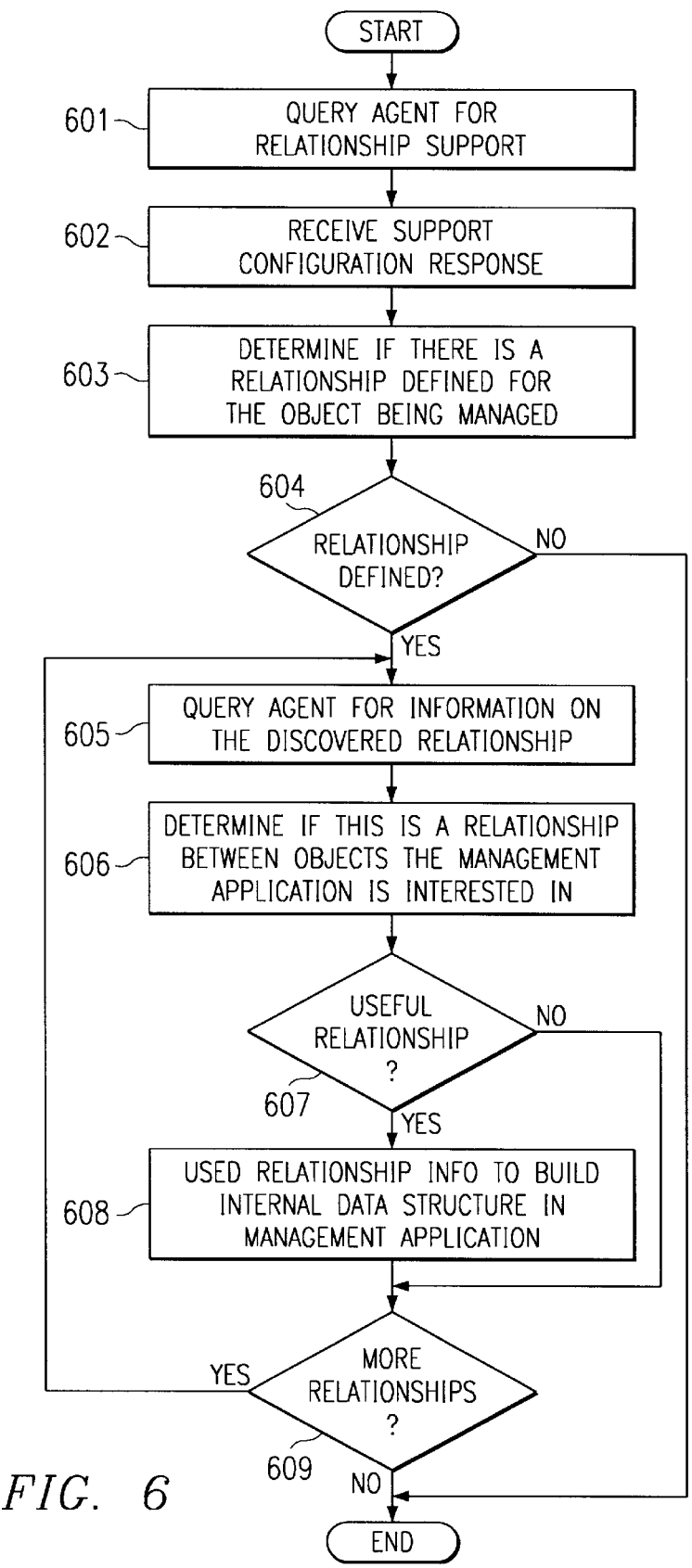
FIG. 6 is a flowchart outlining an exemplary operation of the present invention.

FIG. 6 is a flowchart outlining an exemplary operation of the present invention. As shown in FIG. 6, the operation starts with the management application sending a query message to the SNMP agent device for supported relationships from the SNMP agent device (step 601). The management application then receives, from the SNMP agent device, the information indicating if relationships are configured and supported on this server system (step 602).

A determination is made as to whether there is a relationship defined for the object that is currently being managed (step 603). If a relationship is not defined for the object currently being managed (step 604:NO), the operation ends. If a relationship is defined for the object currently being managed (step 604:YES), the management application sends a query message to the SNMP agent device for information on the discovered relationship (step 605).

A determination is then made as to whether this relationship is a relationship between objects the management application is interested in (step 606). If it is (step 607:YES), the management application uses the relationship information obtained from the SNMP agent device to build an internal data structure in the management application for managing the objects of interest (step 608).

Thereafter, or if the relationship is not useful (step 607:NO), a determination is made as to whether there are more relationships to be processed (step 609). If so (step 609:YES), the operation returns to step 605 Otherwise, the operation ends.

Thus, the present invention provides a mechanism by which relationships between MIB objects can be determined dynamically by a management application. Furthermore, the overhead associated with known systems of maintaining relationship information for network resources is alleviated by the present invention by lessening the overhead on the network servers and centralizing the overhead at the management application thereby providing more efficient use of server resources.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution.

Examples of computer readable media include recordable-type media such a floppy disc, a hard disk drive, a RAM, CD-ROMs, DVD-ROMs, and transmission-type media such as digital and analog communications links, wired or wireless communications links using transmission forms such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of establishing a relationship between a first object identifier and a,second object identifier in a management application, comprising:
   sending a request to an agent device for relationship information for the first object identifier corresponding to the agent device;
   receiving the relationship information from the agent device identifying a relationship between the first object identifier and the second object identifier; and
   creating a data structure within the management application identifying the relationship between the first object identifier and the second object identifier based on the relationship information received from the agent device.

2. The method of claim 1, wherein the first object identifier and the second object identifier are in Management Information Base (MIB) extensions.

3. The method of claim 1, wherein the relationship information received from the agent device is based on data available in a relationship MIB extension.

4. The method of claim 1, wherein the step of creating a data structure is performed only when the relationship information received from the agent device identifies a relationship of interest to the management application.

5. The method of claim 1, wherein the agent device is a Simple Network Management Protocol (SNMP) agent device, and wherein the first object identifier and the second object identifier are in Management Information Base (MIB) extensions.

6. The method of claim 1, further comprising managing the agent device based on the data structure created within the management application.

7. The method of claim 1, wherein the relationship information includes an index, a text description and a relationship access.

8. The method of claim 1, further comprising:
   determining if relationship information for the agent device has been configured, wherein the receiving and creating steps are performed only if relationship information for the agent device has been configured.

9. The method of claim 8, wherein determining if relationship information for the agent device has been configured includes determining if a relationship flag is set.

10. The method of claim 1, wherein the management application manages access to the agent device based on the data structure created based on the relationship information in the management application.

11. The method of claim 1, wherein the relationship information is in the form of a colon separated index.

12. A system for establishing a relationship between a first object identifier and a second object identifier in a management application, comprising:
   a management device; and
   an agent device, wherein:
      the management device sends a request to the agent device for relationship information for the first object identifier corresponding to the agent device;
      the agent device sends the relationship information to the management device identifying a relationship between the first object identifier and the second object identifier; and
      the management device creates a data structure identifying the relationship between the first object identifier and the second object identifier based on the relationship information received from the agent device.

13. The system of claim 12, wherein the first object identifier and the second object identifier are in Management Information Base (MIB) extensions.

14. The system of claim 12, wherein the relationship information sent by the agent device is based on data available in a relationship MIB extension.

15. The system of claim 12, wherein the management device creates a data structure only when the relationship information sent by the agent device identifies a relationship of interest to the management device.

16. The system of claim 12, wherein the agent device is a Simple Network Management Protocol (SNMP) agent device, and wherein the first object identifier and the second object identifier are in Management Information Base (MIB) extensions.

17. The system of claim 12, wherein the management device manages the agent device based on the created data structure.

18. The system of claim 12, wherein the relationship information includes an index, a text description and a relationship access.

19. The system of claim 12, wherein the agent device determines if relationship information has been configured, and wherein the agent device sends relationship information to the management device only if relationship information for the agent device has been configured.

20. The system of claim 19, wherein the agent device determines if relationship information has been configured includes determining if a relationship flag is set.

21. The system of claim 12, wherein the management device manages access to the agent device based on the data structure created based on the relationship information in the management device.

22. The system of claim 12, wherein the relationship information is in the form of a colon separated index.

23. A computer program product in a computer readable medium for establishing a relationship between a first object identifier and a second object identifier in a management application, comprising:

first instructions for sending a request to an agent device for relationship information for the first object identifier corresponding to the agent device;

second instructions for receiving the relationship information from the agent device identifying a relationship between the first object identifier and the second object identifier; and third instructions for creating a data structure within the management application identifying the relationship between the first object identifier and the second object identifier based on the relationship information received from the agent device.

24. The computer program product of claim 23, wherein the first object identifier and the second object identifier are in Management Information Base (MIB) extensions.

25. The computer program product of claim 23, wherein the relationship information received from the agent device is based on data available in a relationship MIB extension.

26. The computer program product of claim 23, wherein the third instructions are implemented only when the relationship information received from the agent device identifies a relationship of interest to the management application.

27. The computer program product of claim 23, wherein the agent device is a Simple Network Management Protocol (SNMP) agent device, and wherein the first object identifier and the second object identifier are in Management Information Base (MIB) extensions.

28. The computer program product of claim 23, further comprising fourth instructions for managing the agent device based on the data structure created within the management application.

29. The computer program product of claim 23, wherein the relationship information includes an index, a text description and a relationship access.

30. The computer program product of claim 23, further comprising:

fourth instructions for determining if relationship information for the agent device has been configured, wherein the second and third instructions are implemented only if relationship information for the agent device has been configured.

31. The computer program product of claim 30, wherein the fourth instructions include instructions for determining if a relationship flag is set.

32. The computer program product of claim 23, further comprising fourth instructions for managing access to the agent device based on the data structure created based on the relationship information in the management application.

33. The computer program product of claim 23, wherein the relationship information is in the form of a colon separated index.

* * * * *

UNITED STATES PATENT AND TRADEMARK OFFICE
CERTIFICATE OF CORRECTION

PATENT NO. : 6,609,155 B1
DATED : August 19, 2003
INVENTOR(S) : Taylor

It is certified that error appears in the above-identified patent and that said Letters Patent is hereby corrected as shown below:

<u>Title page, Item [54] and Column 1, line 2,</u>
Title, after "IN" insert -- A --.

<u>Column 9,</u>
Line 37, after "and a", delete ",".

Signed and Sealed this

Thirtieth Day of March, 2004

JON W. DUDAS
*Acting Director of the United States Patent and Trademark Office*